(12) United States Patent  
Garneyer

(10) Patent No.: US 7,355,498 B2
(45) Date of Patent: Apr. 8, 2008

(54) CONSTRUCTION ELEMENT FOR LOCKING RING MAGNETS IN BORE HOLES

(75) Inventor: Birgit Garneyer, Lüdenscheid (DE)

(73) Assignee: Mts Systems Corporation, Eden Prairie, MN (US)

( * ) Notice: Subject to any disclaimer, the term of this patent is extended or adjusted under 35 U.S.C. 154(b) by 155 days.

(21) Appl. No.: 10/931,484

(22) Filed: Sep. 1, 2004

(65) Prior Publication Data

US 2006/0044097 A1 Mar. 2, 2006

(51) Int. Cl.
*H01F 7/02* (2006.01)
(52) U.S. Cl. .................................... 335/296
(58) Field of Classification Search ............... 310/154.12–154.16; 335/296
See application file for complete search history.

(56) References Cited

U.S. PATENT DOCUMENTS 6,903,475 B2 * 6/2005 Ortt et al. ............. 310/154.07
6,982,511 B2 * 1/2006 Onder et al. ................. 310/91

* cited by examiner

*Primary Examiner*—Ramon M. Barrera
(74) *Attorney, Agent, or Firm*—Steven M. Koehler; Westman, Champlin & Kelly, P.A.

(57) ABSTRACT

An element for use with technical magnets having a mount, the mount to be located in a borehole having a base or counterbore. The element is disposed to lock the magnet mount in place in the borehole so it maintains an axial position oriented in the borehole as well as a radial bias position in the borehole. In this way the magnet surface will not intrude into the bore cylinder.

29 Claims, 2 Drawing Sheets

CONSTRUCTION ELEMENT FOR LOCKING RING MAGNETS IN BORE HOLES

BACKGROUND OF THE INVENTION

1. Field of the Invention

The present invention relates to magnet-spaced sensors and in particular magnets and bore holes.

2. Description of the Prior Art

Magnets are used in a wide variety of detectors. For example, magnetostrictive transducers having elongated wave guides that carry torsional strain waves induced in the wave guide when current pulses are applied along the wave guide through a magnetic field are well known in the art. A typical linear distance measuring device using a movable magnet that interacts with the wave guide when current pulses are provided along the wave guide is shown in U.S. Pat. No. 3,898,555.

Devices of the prior art of the sort shown in U.S. Pat. No. 3,898,555 also have the sensor element in a housing which also houses the electronics to at least generate the pulse and receive the return signal. The amplitude of the return signal detected from the acoustical strain pulse is, as well known in the art, affected by many parameters. These parameters include the position magnet strength, wave guide quality, temperature, wave guide interrogation current, and assembly tolerances. In the prior art, the wave guide is connected to a return wire to complete the electrical circuit necessary for the wave guide to generate the pulse which stimulates the return signal.

Several types of magnetic-based sensors are available for measuring linear or rotary position. Magnetic-based sensors have an advantage in that they provide non-contact sensing; so there are no parts to wear out. Examples of magnetic-based sensors are LVDTs, inductive sleeve sensors, and magnetostrictive sensors.

Technical magnets are often made of mechanically very brittle materials, with very simple geometries due to restrictions in the production technologies. In order to install these magnets in machine parts, additional mechanical components are always required for fixing them. These must ensure that the magnets are stressed very little mechanically and that the magnets also remain in a mechanically invariable position in the relevant environment. Additionally, the unavoidable mechanical tolerances of the magnet and of the installation environment must be compensated when mounting. Frequently, these tolerances are relatively high with magnets.

In the art, these requirements are frequently met at relatively high expenditure, by means of sealing compound, elastomers, sheet-metal retainers, screwing, snap rings, etc. In almost all cases, combination of several of the specified auxiliary means is required. Apart from the large quantity of components, the mounting expenditure is also relatively high It is an object of the present invention to provide a solution for installation of magnet rings securely in bore holes.

SUMMARY OF THE INVENTION

The invention is a construction element, which provides a good solution for installation of magnet rings, ring-shaped or circular, generally round, brittle and mechanically sensitive components, e.g. sinter magnets in bore holes.

The elements of the invention include features of:

A Spring element which can compensate tolerances in radial and axial direction.

A spring element which locks the ring magnet axially in a suitable bore hole, by means of spring arms which support the magnet ring against the base of the bore and also support the spring element itself in a groove in the inner surface of the bore whereby the magnet ring is locked definitely in axial direction.

A spring element which fixes the ring magnet in a bore hole in radial direction by means of further spring arms tilted to it, which are located between the surface of the magnet and the inner mantle surface of the bore hole. These spring arms are distributed regularly over the circumference and, in untightened condition, directed at a suitable angle related to the tangent of the surface. When installing the ring magnet and the spring element into the bore hole, these spring arms are slightly distorted, whereby a permanent torsional spring pre-tension is provided. In this way, the magnet ring is definitely locked in radial direction.

By suitable geometrical design of all spring arms, the holding forces must be dimensioned so that they are sufficiently high enough to keep the magnet safely and precisely in radial and axial direction, and on the other hand, so that no unduly high mechanical forces are induced into the magnet ring.

Further construction elements for locking the ring magnet in axial and radial direction are not required.

The spring element is of metal. This ensures that the required defined pre-tension in axial and radial direction can be provided. There are no setting properties, like e.g. with plastics. Thus, the magnet ring is locked in position permanently and precisely and fixed safely. Preferably, the spring element metal should be of non-ferromagnetic material, in order not to affect the magnetic field of the magnet ring in an inadmissible way.

As the spring element is of metal and can be passivated necessary, good fluid compatibility is ensured with normal technical applications, especially oil or water-based hydraulic systems.

The spring element is designed as a punch-bended part and can be supplied preferably as a pre-punched part (FIG. 3), such as a single element within a band of any length on rolls. Dependent of the number of spring elements which are cut off in one piece from the band, the spring elements can be used for magnet rings of various diameters.

By means of the proposed spring element, the installation procedure of a ring magnet into a bore hole is limited to inserting the magnet into the spring element and to inserting the spring element into the bore hole. As described, no further auxiliary means or elements are required.

Consequently, the installation of a ring magnet into a bore hole is a very low-priced operation.

BRIEF DESCRIPTION OF THE DRAWINGS

For a further understanding of the nature and objects of the present invention, reference should be had to the following figures in which like parts are given like reference numerals and wherein.

DESCRIPTION OF THE PREFERRED EMBODIMENTS

Figure 1:
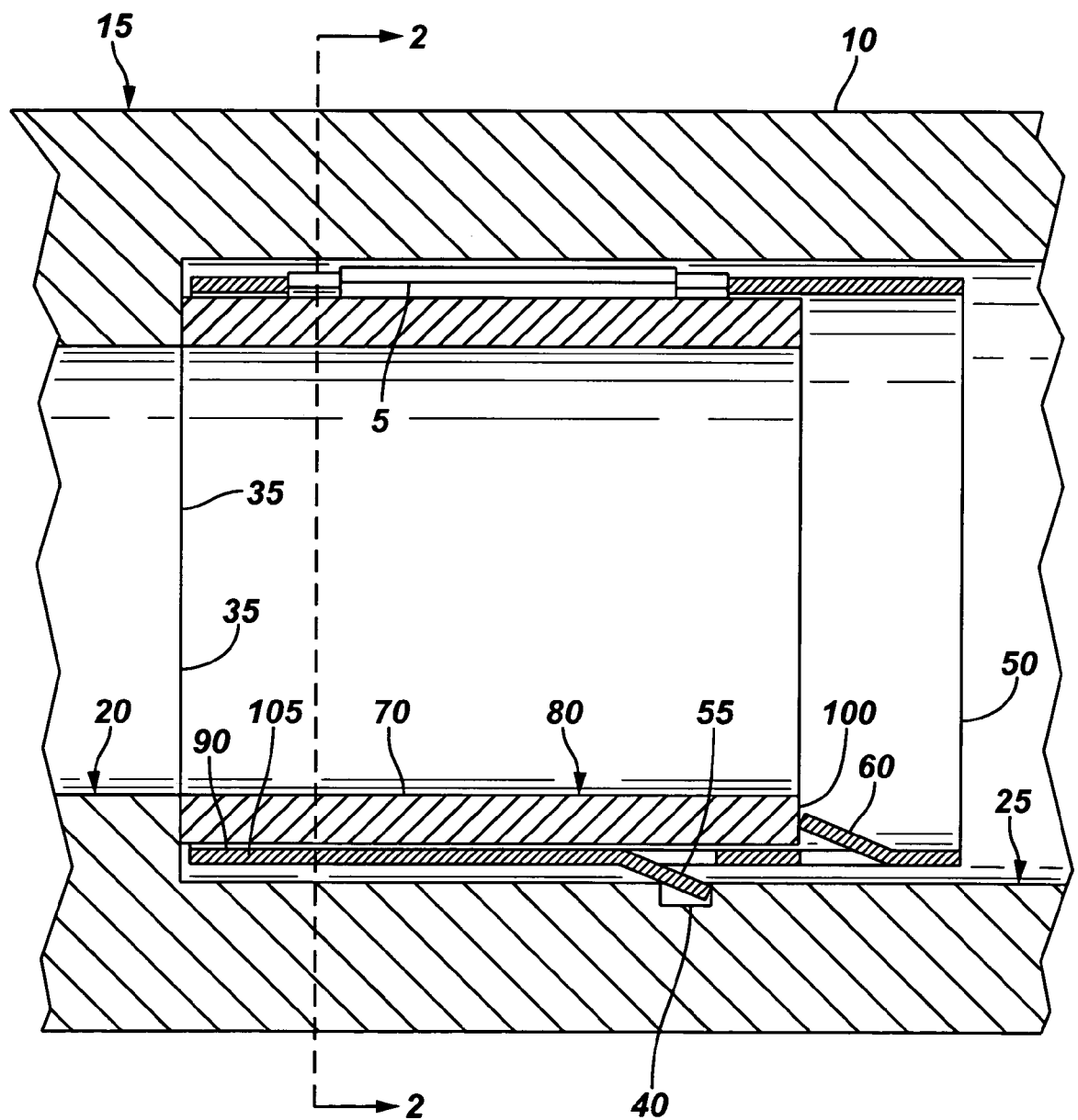
FIG. 1 is a side cross-sectional view of a bore hole in which the magnet ring is installed by means of the preferred embodiment of the present invention.
Figure 2:
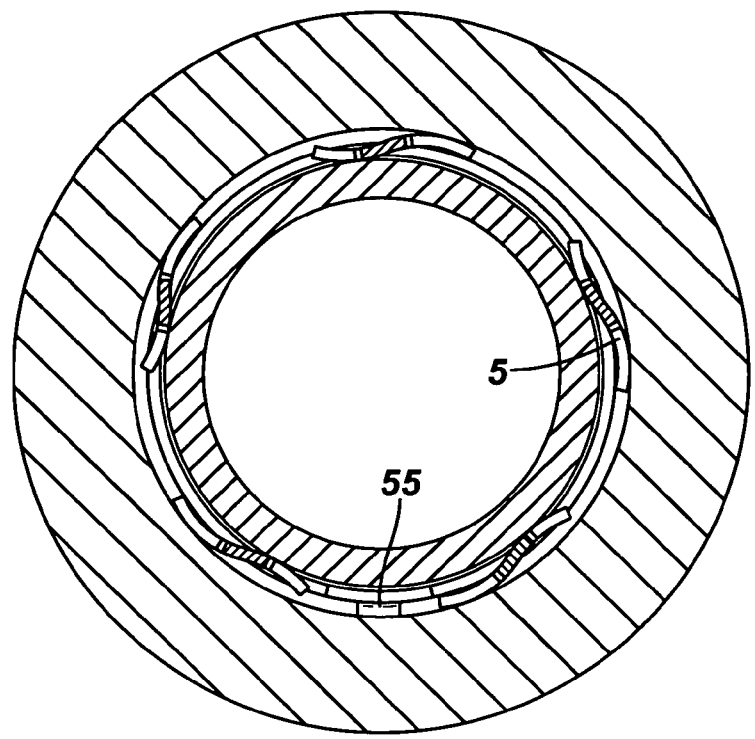
FIG. 2 is a side cross-sectional view taken along lines 2-2 of FIG. 1.

As shown in FIG. 1, a cylindrical mounting form or cylinder 10 to support mounting a magnet therein is shown. Cylindrical form 10 has an outer cylindrical surface 15 and an inner cylindrical surface 20. Inner cylindrical surface 20 forms the bore for the cylinder 10. A counter bore 25 is formed having a larger diameter than the bore having surface 20 and terminating at shoulder 35. A cylindrical grove 40 is formed in the inner surface of counter bore 25.

A lock piece 50 is provided and sized to fit within counter bore 25 without the inner surface of locking piece 50 extending into the bore beyond the surface 20. Lock piece 50 includes an outer dog 55 and an inner dog 60. Locking piece 50 is made of spring-type material. Therefore, inner and outer dogs 55, 60 normally bias outwardly and inwardly, respectively, unless they are compressed. Each outer locking dog 55 is sized to fit within grove 40.

As further shown in FIG. 1, a magnet 70 is sized to fit within the counter bore 25 without the inner surface 80 of the magnet 70 extending into the bore beyond the surface 20 when magnet 70 is locked in place. Thus magnet 70 has a thickness such that its inner surface 80 is flush with the inner surface 20 of cylinder 10 when magnet 70 is locked in place.

In operation, locking mechanism 50 is slid along inner surface 25 of cylinder 20 until outer locking dog 55 falls into or springs into grove 40. Thereafter, magnet 70, usually having its north surface on the inside 80 of the magnet 70, may be slid along the inner side 90 of locking mechanism 50 locking dog 60, depressing inner dog 60 until the end 100 of inner magnet 70 passes past inner locking dog 60 so that it no longer depresses inner locking dog 60. Inner locking dog 60 will then spring up abutting end 100 of magnet 70, thereby holding magnet 70 in place without glue and without cracking elastomers or without cracking or otherwise applying lateral pressure onto magnet 70. The spring force of outer locking dog 55 further acts to center magnet 70 using a support ring 105 formed by to add further lateral support to magnet 70.

On this basis:

A spring element 50 which can compensate tolerances in radial and axial direction.

A spring element 50 which locks the ring magnet 70 axially in a suitable bore hole, by means of spring arms 60 which support the magnet ring 70 against the base 25 of the bore 10 and also support the spring element 50 itself in a groove 40 in the inner surface 25 of the bore whereby the magnet ring 70 is locked definitely in axial direction.

A spring element 50 which fixes the ring magnet 70 in a bore hole 25 in radial direction by means of further spring arms 60 tilted to it, which are located between the surface 100 of the magnet 70 and the inner mantle surface of the bore hole 25. These spring arms are distributed regularly over the circumference and, in untightened condition, directed at a suitable angle related to the tangent of the surface 20. When installing the ring magnet 70 and the spring element 50 into the bore hole, these spring arms 60 are slightly distorted, whereby a permanent torsional spring pre-tension is provided. In this way, the magnet ring 70 is definitely locked in radial direction.

By suitable geometrical design of all spring arms 50, the holding forces must be dimensioned so that they are sufficiently high enough to keep the magnet safely and precisely in radial and axial direction, and on the other hand, so that no unduly high mechanical forces are induced into the magnet ring 70.

Further construction elements for locking the ring magnet 70 in axial and radial direction are not required.

The spring element 50 is of metal. This ensures that the required defined pre-tension in axial and radial direction can be provided. There are no setting properties, like e.g. with plastics. Thus, the magnet ring is locked in position permanently and precisely and fixed safely. Preferably, the spring element metal should be of non-ferromagnetic material, in order not to affect the magnetic field of the magnet ring in an inadmissible way.

As the spring element 50 is of metal and can be passivated, if necessary, good fluid compatibility is ensured with normal technical applications, especially oil or water-based hydraulic systems.

Figure 3:
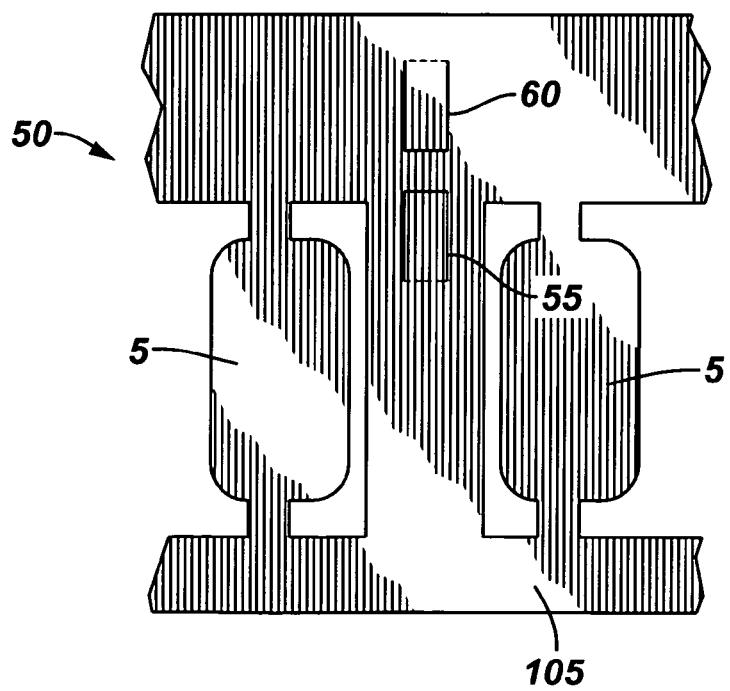
FIG. 3 is an illustration of a pre-punched part for a spring element of the preferred embodiment.

The spring element 50 is designed as a punch-bended part and can be supplied preferably as a pre-punched part (FIG. 3), such as a single element 50 within a band of any length on rolls. Dependent of the number of spring elements 50 which are cut off in one piece from the band, the spring elements can be used for magnet rings of various diameters.

By means of the proposed spring element 50, the installation procedure of a ring magnet 70 into a bore hole is limited to inserting the magnet 70 into the spring element 60 and to inserting the spring element 50 into the bore hole. As described, no further auxiliary means or elements are required.

Consequently, the installation of a ring magnet 70 into a bore hole 20, 25 is a very low-priced operation.

What is claimed as invention is:

1. A magnet assembly comprising:
    a mounting form having a borehole;
    a magnet; and
    a spring element of size to be inserted in the borehole, said spring element having a portion engaging the magnet, a first surface radially biasing said spring element from an inner surface of the borehole and a second surface engaging an inner surface of the borehole to hold the magnet in a fixed, axial position in the borehole.

2. The assembly of claim 1, wherein the magnet is in the form of a ring and said spring element is in the form of a ring, and wherein the spring element comprises a plurality of spaced apart first surfaces biasing the magnet radially from the inner surface of the borehole.

3. The assembly of claim 1, wherein the magnet is a sintered magnet and said spring element minimizes stress on the magnet.

4. The assembly of claim 2, wherein the inner surface has a groove and said second surface comprises a first dog seated in the groove.

5. The assembly of claim 4, wherein the portion comprises a second dog abutting an end of the magnet wherein an opposite end of the magnet engages an inner surface of the mounting form.

6. The assembly of claim 5, wherein said first and second dogs are spaced apart so that said first dog is situated in the groove when said second dog abuts the end.

7. The assembly of claim 6, wherein said first dog is spring biased to extend into the groove.

8. The assembly of claim 7, wherein said second dog is spring biased to abut the end when the magnet is positioned in the borehole.

9. The assembly of claim 1, wherein said spring element is of metal.

10. The assembly of claim 1, wherein said spring element includes a punch bended part.

11. A magnet assembly comprising:

a magnet;

a mounting form having a bore and a counterbore, the counterbore of size to receive the magnet and larger than the bore in order to form a shoulder;

a spring element of size to be inserted in the counterbore and having a first surface radially biasing said spring element from an inner surface of the counterbore; and said spring element having a portion to engage the magnet and a second surface engaging an inner surface of the counterbore to hold the spring element and magnet in a fixed position axially in the counterbore.

12. The assembly of claim 11, wherein said magnet comprises a ring and said spring element comprises a plurality of spaced apart first surfaces that bias said magnet coaxially with said counterbore.

13. The element of claim 11, wherein the magnet is a sintered magnet and said spring element minimizes stress on the magnet.

14. The assembly of claim 11, wherein said counterbore has a groove and said second surface comprises a first dog seated in said groove.

15. The assembly of claim 14, wherein said portion comprises a second dog, said second dog abutting an end of the magnet, thereby locking said magnet axially within said borehole against said shoulder.

16. The assembly of claim 15, wherein said first and second dogs are spaced apart so that said first dog is situated in said groove when said second dog abuts said end.

17. The assembly of claim 16, wherein said first dog is spring biased to extend into said groove.

18. The assembly of claim 17, wherein said second dog is spring biased to abut said end.

19. The assembly of claim 18, wherein said spring element is in the form of a ring and comprises a plurality of spaced apart first surfaces.

20. The assembly of claim 11, wherein said spring element includes a punch bended part.

21. In a magnet-based sensor, a magnet assembly comprising:

a magnet;

a mounting form having a bore and a counterbore, the counterbore of size to receive the magnet and larger than the bore in order to form a shoulder;

a spring element of size to be inserted in the counterbore and having a first surface radially biasing said spring element from an inner surface of the counterbore; and said spring element having a portion to engage the magnet and a second surface engaging an inner surface of the counterbore to hold the spring element and magnet in a fixed position axially in the counterbore.

22. The assembly of claim 21, wherein said magnet comprises a ring and said spring element comprises a plurality of spaced apart first surfaces that bias said magnet coaxially with said counterbore.

23. The assembly of claim 21, wherein said counterbore has a groove and said second surface comprises a first dog seated in said groove.

24. The assembly of claim 23, wherein said portion comprises a second dog, said second dog abutting an end of the magnet, thereby locking said magnet axially within said borehole against said shoulder.

25. The assembly of claim 24, wherein said first and second dogs are spaced apart so that said first dog is situated in said groove when said second dog abuts said end.

26. The assembly of claim 24, wherein said first dog is spring biased to extend into said groove.

27. The assembly of claim 26, wherein said second dog is spring biased to abut said end.

28. The assembly of claim 27, wherein said spring element is in the form of a ring and comprises a plurality of spaced apart first surfaces.

29. The assembly of claim 28 wherein the magnet-based sensor includes an elongated waveguide that carries torsional strain.

* * * * *